(No Model.)
T. G. LOVEGROVE.
BLOW-OFF APPARATUS.
No. 320,878. Patented June 23, 1885.
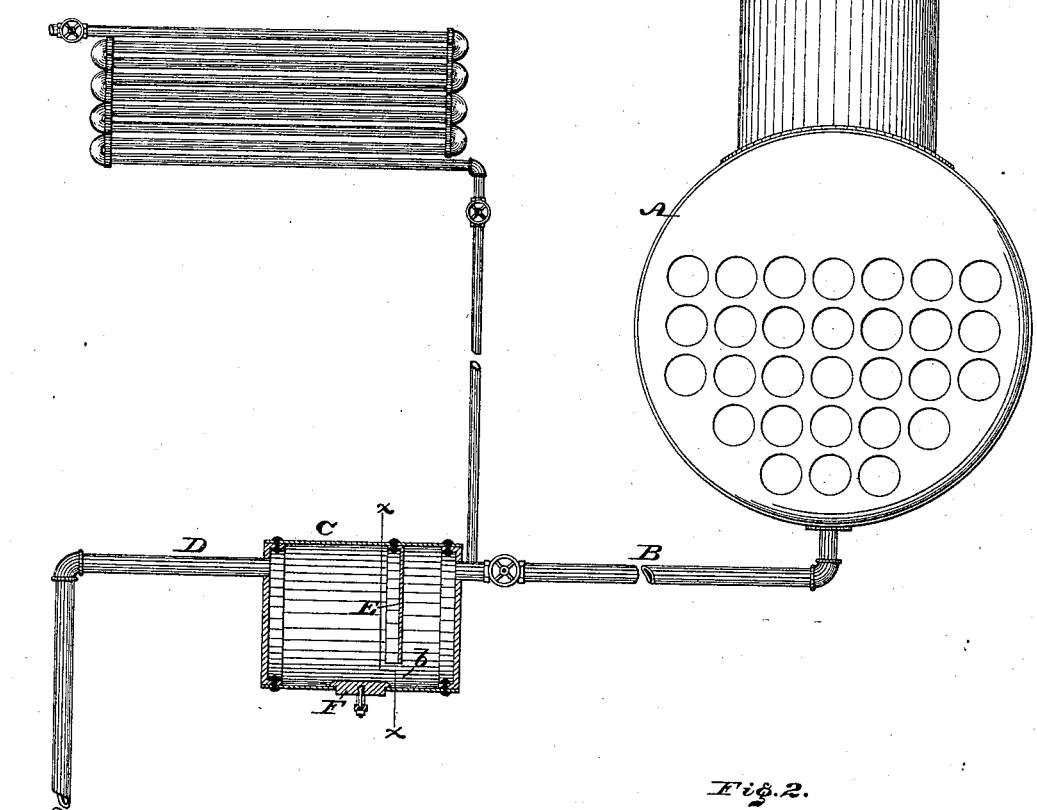
WITNESSES:
A. P. Grant,
W. F. Kircher
INVENTOR:
Thomas G. Lovegrove,
BY John A. Biedersheim
ATTORNEY.

United States Patent Office.

THOMAS G. LOVEGROVE, OF PHILADELPHIA, PENNSYLVANIA, ASSIGNOR OF ONE-HALF TO SHERMAN & DELAPLAINE, OF SAME PLACE.

BLOW-OFF APPARATUS.

SPECIFICATION forming part of Letters Patent No. 320,878, dated June 23, 1885.

Application filed March 4, 1884. (No model.)

*To all whom it may concern:*

Be it known that I, THOMAS G. LOVEGROVE, a citizen of the United States, residing in the city and county of Philadelphia, State of Pennsylvania, have invented a new and useful Improvement in Blow-Off Apparatus, which improvement is fully set forth in the following specification and accompanying drawings, in which—

Figure 1 is a partial side elevation and partial vertical section of blow off apparatus embodying my invention. Fig. 2 is a section in line $x\ x$, Fig. 1.

Similar letters of reference indicate corresponding parts in the two figures.

My invention consists of means of disposing of boiler "blow-off" by directing the same into the ground into the water-strata thereof, the nature of the same and advantages whereof being hereinafter fully set forth.

Referring to the drawings, A represents a steam-boiler of any desired form, and B represents a blow-off pipe leading therefrom.

C represents a mud or scale drum, which is in communication with the pipe B and with a pipe, D, which, perforated at or near its lower end, is driven or sunk into the ground to such extent that the perforated portion constituting the discharge end of the pipe is within the water-strata of the ground, whereby the pipe is in communication with the water thereof.

In the drum C is a diaphragm, E, which depends therefrom between the ends of the same, leaving a passage, $b$.

It will be seen that when hot water is blown off it leaves the boiler and enters the drum C, passing therefrom into the pipe D, and is directed through the perforations of the pipe D into the water of the ground, thus effectually disposing of the blow-off, obviating the objectionable features of directing blow-off hot and muddy water into a sewer or directly into the atmosphere.

As the water enters the drum C, it is directed against the diaphragm E, which, acting as a deflector, causes the mud and scale to fall to the bottom of the drum, from which they may be removed through the hand-hole F, with which the drum is provided.

Where the drum C is not required, the blow-off passes directly from the boiler into the pipe D.

It is evident that "drips" may be conveyed to the pipe B or drum C or directly to the pipe D, and thus reach the water-strata of the ground.

Having thus described my invention, what I claim as new, and desire to secure by Letters Patent, is—

A steam-boiler and a pipe for blow-off therefrom driven or sunk into the ground to the water-strata thereof and in communication therewith, in combination with a mud and scale drum intermediate of said pipe and boiler and in communication therewith, substantially as and for the purpose set forth.

THOS. G. LOVEGROVE.

Witnesses:
JOHN A. WIEDERSHEIM,
JNO. K. PLITT.